June 22, 1937.  E. G. GOODWIN  2,084,638
WEDGE SNUBBING DEVICE
Filed June 19, 1934   2 Sheets-Sheet 1

INVENTOR.
E. G. GOODWIN.
BY H. H. Snelling
ATTORNEY.

June 22, 1937.　　　E. G. GOODWIN　　　2,084,638
WEDGE SNUBBING DEVICE
Filed June 19, 1934　　　2 Sheets-Sheet 2

INVENTOR.
E. G. Goodwin.
BY H. H. Snelling
ATTORNEY.

Patented June 22, 1937

2,084,638

UNITED STATES PATENT OFFICE 2,084,638

WEDGE SNUBBING DEVICE

Ernest G. Goodwin, Pelham, N. Y., assignor to Graham-White Sander Corporation, Roanoke, Va., a corporation of Virginia Application June 19, 1934, Serial No. 731,331

16 Claims. (Cl. 267—9)

This invention relates to snubbing or shock absorbing devices primarily for railway car trucks and has for its principal object the provision of a snubbing device which, while damping shocks and preventing accumulative bouncing and rocking, will permit all non-shock producing or minor movements of the car bolster, thus providing a flexible snubbing connection between the sprung and the unsprung parts of the truck.

Another object is to provide a snubber in which the shock absorbing effect increases with the movement and begins with a value determined by the load on the car truck.

An important object is to provide a shock absorbing device in which the effectiveness to dampen the shocks is not appreciably affected by wear of the parts.

Still another object is to provide a snubber of very simple construction which may be placed in existing car structure without the expense of altering the frames, bolsters, or spring planks in any way and at a minimum cost in time and labor. It is also a features of the invention to provide a snubber which may be built into new equipment with only small changes in design, that is, the snubber supporting brackets may be built into the bolster and/or into the spring plank.

It is a further object of the invention to provide a snubber having large frictional areas and in which a variable snubbing action is produced by a low unit pressure varying with the amount of relative travel of the parts. Incident to this object is the provision of a snubber in which no relative movement of the frictional surfaces occurs until the movement of the bolster reaches a predetermined amount, thus preventing wear in the snubber due to minor vibrations and also preventing the formation of shoulders on the friction surfaces.

Another object of the invention is so to arrange an assembly of friction plates that shoulders can never be formed on any of the friction surfaces.

A further object of the invention is to provide a snubber that can be associated with the springs in the usual car truck in such a way that the shimming up of the springs does not affect the snubbing action whereby no adjustment or disturbance of the snubber is necessary in the shimming process.

In the last few years railway operators have shown an increased interest in snubbers for freight cars and some efficient devices have been developed but there are two drawbacks common to all of the best snubbers or shock absorbers which are, first, the excessive cost due either to the complexity of the device or to the necessity of replacing present equipment and, second, the necessity of frequent replacement due to wear on the friction units of the snubbers. It is an object of this invention to provide a snubber which does not have these two disadvantages, that is, to provide a low cost, long life snubber of such simple design that it can be inserted in existing car trucks with very little trouble and without the sacrifice or even the adjustment of the present equipment.

In the drawings:—

Figure 1:
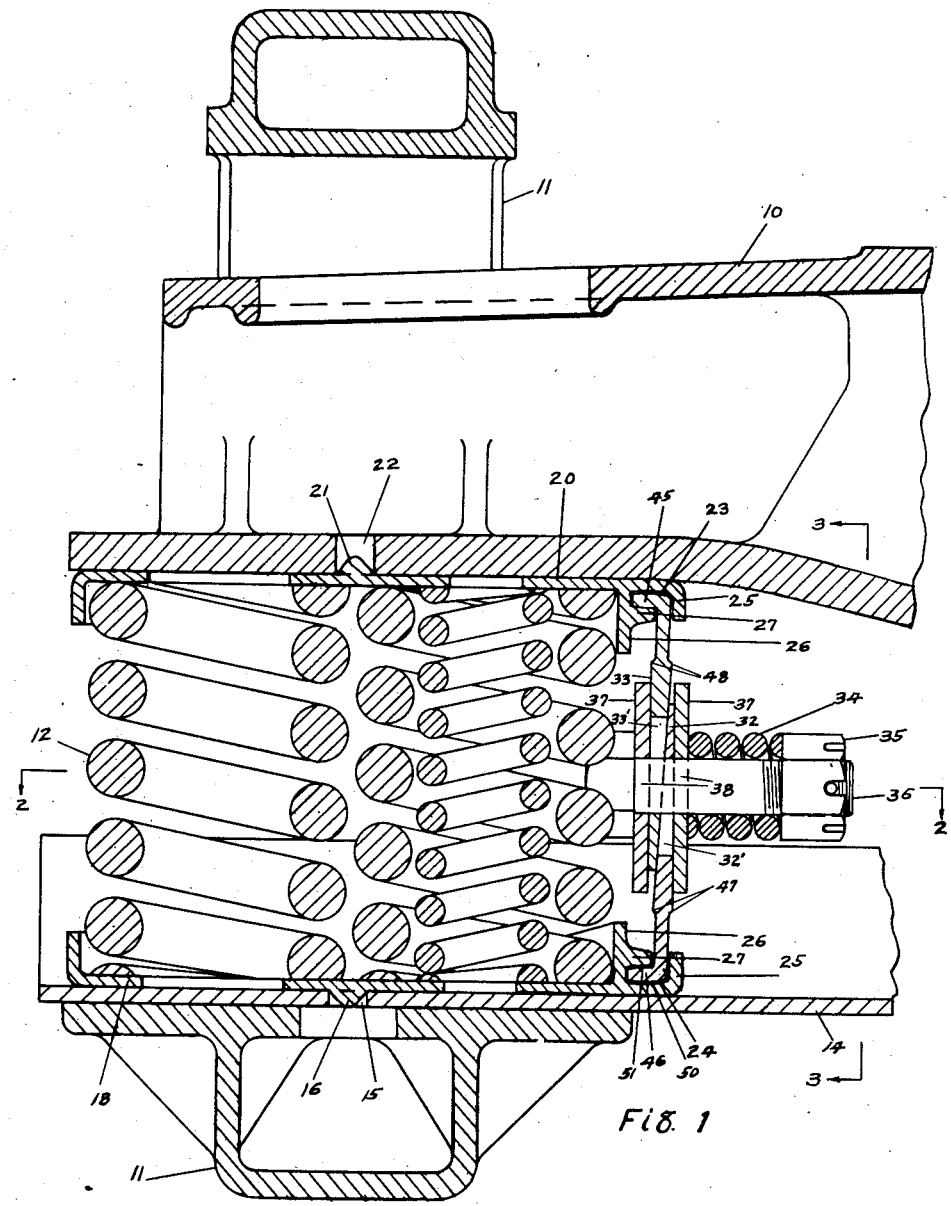
Figure 1 is a sectional elevation of the snubber looking longitudinally of the car and showing the association of the snubber with the bolster, the springs and the spring plank.
Figure 2:
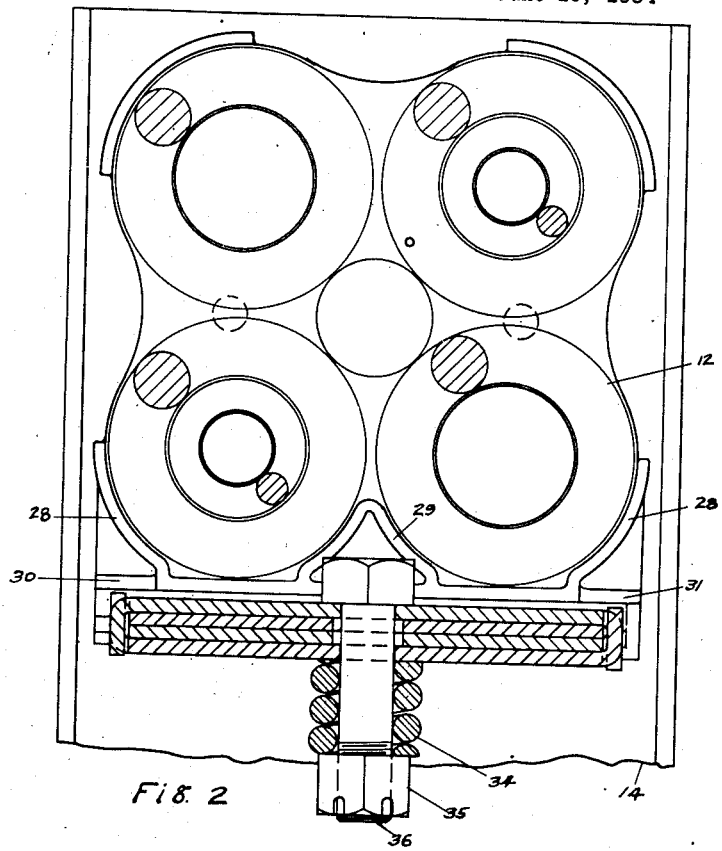
Figure 2 is a horizontal section taken on lines 2—2 of Figure 1.

Referring to Figure 1 the bolster 10 is shown as supported in the truck frame 11 by means of a nest of springs 12 resting on the spring plank 14. One or more apertures 15 may be provided in the spring plank to accommodate one or more lugs 16 on the spring cap 18 which construction prevents the movement of the spring cap with respect to the plank. The spring cap 20 is provided with a corresponding lug or lugs 21 which engages in one or more apertures 22 in the bolster 10. The spring caps, which are preferably indentical castings and therefore interchangeable, are provided with undercut grooves 23 and 24 which grooves constitute the preferred supporting means for the snubber proper to be described further along. The groove is formed by the upright flanges 25 and 26 and the horizontal ledge 27 carried by the latter. In order to stiffen the spring cap adjacent the groove the spring embracing flanges 28 and 29 may be made integral with the flange 26 which flange however, extends to the edge of the spring cap at 30 and 31, thereby permitting the use of wider snubbers and also reenforcing the corners of the cap 18. The caps may be designed to interchangeably accommodate either single or double coil springs.

Figure 4:
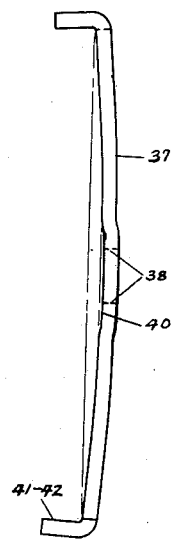
Figure 4 is an edgewise view of one of the spring friction plates.
Figure 3:
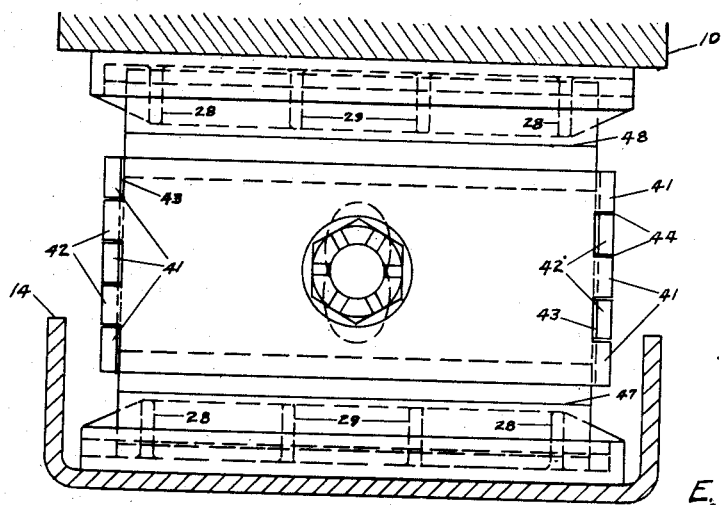
Figure 3 is a vertical section taken on lines 3—3 of Figure 1 and showing the snubber in elevation.
Figure 5:
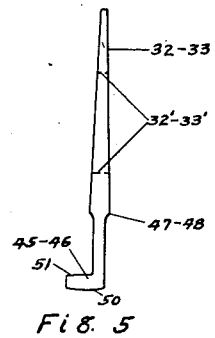
Figure 5 is an edgewise view of one of the friction members.

The snubber proper consists of two friction members 32 and 33 apertured at 32' and 33' and loosely carried in the grooves 23 and 24 respectively, and held together by resilient means such as the spring 34, the tension of which may be adjusted by the castled nut 35 on the bolt 36 which carries the spring. The pressure of the spring is distributed over the entire engaging areas of the friction member by means of two spring friction plates 37 which have apertures 38 for snugly receiving the bolt, the peripheral margins 40 of the apertures being struck up, as best seen in Figure 4, to prevent all wear of the parts adjacent the bolt, i. e., the weakest spot; although the apertures 38 have been mentioned as snugly receiving the bolt 36 it will of course be understood that there is a working tolerance as usual and not a drive fit. The spring friction plates 37 are preferably identical in shape having an odd number of right angularly bent fingers 41 on one end and an even number of like fingers 42 on the other end and which fingers are spaced so that when two plates are bolted in place on the friction members as best shown in Figure 3, the fingers 41 interlock with the fingers 42 to prevent excessive relative vertical movement of the plates and to facilitate the assembly of the snubber. The fingers are preferably spaced from the edges of the friction members as at 43 and from each other as at 44, thus permitting a limited relative movement of the spring friction plates and increasing the ease of assembly.

The friction members 32 and 33 are preferably tapered, as shown in Figure 1, in order that the snubbing action will be greater when the car is heavily loaded and the springs compressed and will be less when the car is light and the springs extended. Another result of the taper or wedge shape is that the snubbing action will vary with the magnitude of the disturbance thus requiring an appreciably smaller initial tension in the spring 34 than is required when the friction members are flat plates.

Referring to Figure 1, it will be seen that the distance from the ends of the apertures 32'—33' to the ends 47—48 of the friction surfaces on the tapered members is less than the distance from the bolt 34 to the edge of the friction surface on the friction spring plates 37. This dimensioning permits the spring plates and the ends of the wedges to pass beyond the surface edges 47 and 48, thereby preventing the formation of shoulders that would otherwise be formed if the surface edges were beyond the travel of the plates 37. In other words the friction members are so arranged that in the normal snubbing operation of the device the friction surfaces of each pair alternately overlap each other as the bolster moves up and down.

The grooves 23 and 24 in the spring caps are preferably of a size to receive loosely the flanged edges 45 and 46 of the friction members in order to permit a limited movement of the bolster with respect to the unsprung parts. The flanged edges and the walls of the groove may have curved or arcuate cooperating surfaces as at 50· and 51 so as to provide easier hinge action and also so the parts will find their own seats. The limited movement just mentioned permits an expansion and compression of the springs thru small distances without any snubbing effect whatsoever and consequently without any rubbing or wear on the friction surfaces.

Altho the snubber is shown as located on the inside of the spring nest, the structure is such that it can be located on the outside, if room permits, without any change other than perhaps the shortening of the spring 34 and the bolt 36. It is also to be observed that the snubber hangers, i. e., the grooved supports, need not be integral with or connected to the spring caps but are intended to be carried at any suitable location on the sprung and unsprung parts; however, it is important that the connection between the snubber and the supports be free and loose in order to provide the desirable flexibility.

In operation the bolster has a certain freedom of universal movement without bringing the snubber into play, for example, looking at Figure 1 it will be seen that the bolster may move longitudinally of itself due to the free hinge connection between the hangers and the snubber; the bolster may move laterally due to the lipped edges 45 and 46 being freely slidable in the grooves of the hangers; the bolster may rock an appreciable amount about a transverse axis due to the same looseness of fit; and by operating one snubber more than the other the bolster may rotate about its longitudinal axis also due to the looseness of fit in the hangers and by rotating one friction member on the other; and finally, but most important of all, the bolster may move up and down a limited amount without causing a snubbing action. If any of the last three movements is in excess of a certain allowable minimum there will be a movement of the friction members 32—33 with respect to each other and there may be a movement of one or both friction spring plates 37—37 with respect to the friction members. If the disturbance is in excess of the free movement or slack at 45 and 46 the spaces 44 between the fingers 41 and 42 will permit a snubbing movement of the friction members without movement of either spring plate on its proximate friction member but if the disturbance is a little greater, one of the spring plates may stick to its friction member and carry the other plate along with it and cause said other plate to rub on its proximate friction member and finally if the disturbance is still greater, each plate will move either together or alternately with respect to the friction members which are at the same time moving with respect to each other.

It will be appreciated that if the friction members 32 and 33 are not tapered there will be two degrees of snubbing depending on the amplitude of the disturbance, i. e., one degree when only two friction surfaces are acting, and a second degree when four or six surfaces are acting. When the friction members are tapered or wedge-like, each of these two degrees or ranges will theoretically have an infinite number of snubbing values due to the increase or decrease of pressure of the friction surfaces against each other as the bolster moves toward and away from the spring plank. In the structure shown the variation of snubbing values is practically important only in the case of second degree disturbances.

Aside from the simplicity of installation and other advantages already mentioned there is another important advantage in making the snubber hangers or supports as part of the spring caps which is that it permits shimming up of the springs without disturbing the snubber. If the hangers are a part of or otherwise secured to the rigid sprung and unsprung parts, as they well might be within the scope of my invention, it probably would be necessary to provide friction members of a different length. It will be apparent that when desirable more than one snubber may be used with each nest of springs. Also for the sake of clearance for the bolt head it may be desirable to use two bolts for cars having spring nests of six springs or having a spring arrangement which would not allow for clearance of a central bolt.

What I claim is:

1. In a vehicle having associated sprung and unsprung parts, the combination of a hanger movable with the sprung part, a support on the unsprung part, and a snubbing unit connected to the hanger and to the support, said unit comprising relatively movable friction plate members, a plurality of said members each having a plurality of friction snubbing surfaces, a plurality of said members each having a single snubbing surface, said last mentioned members being spring plates oppositely bowed away from the other members in their disassembled state, some of the surfaces on the first mentioned members cooperating with each other and the other surfaces cooperating with said single snubbing surfaces, all of said cooperating surfaces having upper and lower edges and being in substantial registration whereby the edges of each pair of contacting surfaces pass and repass each other during snubbing thereby preventing the formation of shoulders on the friction surfaces, and means for resiliently clamping said bowed members having a single snubbing surface against the other members to create approximately equal pressure over the entire contacting area of each pair of snubbing surfaces.

2. In a car truck snubber, a car truck member, a spring supported bolster member, a friction member loosely connected to the bolster member, a second friction member loosely connected to the car truck member, means carried by and resiliently holding the two friction members in frictional contact with each other, said means including elements frictionally engaging said friction members, one of said friction members being tapered in the direction of travel thereby producing graduated snubbing action in accordance with the distance between the bolster member and the car truck member, and said friction elements being movable with respect to the friction members whereby to create additional snubbing action.

3. An assembly for use in a snubber, comprising a pair of relatively movable apertured friction plates having frictional engagement, a pair of apertured spring holding plates connected to move together and receiving between them said friction plates, said spring plates in their natural disassembled state being oppositely bowed, and means for maintaining said holding plates in frictional engagement with said friction plates, said means including a bolt passing through all of said plates for drawing the spring plates into contact with the friction plates.

4. The assembly of claim 3 in which the apertures of said friction plates are centrally located and elongated in the direction of maximum travel to permit relative movement of said friction plates and to permit movement of the bolt and spring plates with respect to the friction plates.

5. A snubbing device comprising two tapered plate-like members engaging each other on one of their broad surfaces, the non-engaging surfaces being parallel, each of said members have a central elongated aperture, a spring steel plate engaging each of said parallel surfaces, a bolt passing thru said plates and said elongated apertures, spring means on said bolt for resiliently holding said plates against said members and for thereby holding said members against each other, and means on said members for supporting the device.

6. The device of claim 5 in which each of said plates has on each end right angularly bent fingers interlocked with like fingers on the other plate, said interlocking fingers being normally spaced from each other to permit a limited relative vertical movement of the plates.

7. A spring cap having marginal ribs adapted to receive a nest of springs and having means along a margin for supporting a snubbing device, said means comprising two spaced parallel flanges forming a groove and a rib on one of said flanges partially closing said groove, part of the walls of said groove being cylindrical for accomodating a partially cylindrical body.

8. The device of claim 7 in which a plurality of the marginal ribs are integrally connected to the ribbed flange to stiffen the cap adjacent the groove.

9. In a car truck having a bolster spring supported on a spring plank, a friction snubbing device comprising a pair of vertical wedges of substantially the same width as and arranged transversely of the spring plank, one being supported to move with the bolster and the other being supported by the spring plank, and resilient means including friction plates engaging the outside of said wedges for holding said wedges together in overlapping arrangement, said plates being frictionally slidable on said wedges to increase the snubbing effect, the engaging surfaces being of such area and location that the upper edges and lower edges of the wedge surface alternately pass each other during a snubbing operation as the bolster moves up and down whereby the entire surfaces are worn uniformly.

10. The combination of claim 1 in which the snubbing unit is loosely carried by the support and hanger thereby permitting a certain amount of free non-vertical movement of the bolster before any snubbing action occurs.

11. In a car truck having side frames for receiving the ends of a springplank and bolster, springs for supporting the bolster, a friction snubbing device comprising a pair of substantially upright tapered friction plates arranged parallel to the side frames, one of said plates being loosely supported to move with the bolster, the other plate being supported on the spring plank and resilient means including a pair of friction plates for holding said tapered plates together said means being carried by said plates.

12. A non-load-supporting snubbing assembly adapted to be associated with a nest of springs in the truck of a railway car and comprising a spring cap for replacing the upper spring cap in existing equipment, a second spring cap for replacing the lower spring cap in existing equipment, said caps being identical and each having a groove therein so located that when the caps are in place in a car truck the groove in one is directly above that in the other, a tapered plate loosely carried in the upper groove, a tapered plate loosely carried in the lower groove, and means for resiliently holding said plates together said means being movable with respect to said plates.

13. The assembly of claim 12 in which said holding means includes a pair of normally bowed friction plates having clamped between them said tapered plates.

14. A snubbing device for railway cars comprising two plate like members engaging each other on one of their broad surfaces, one edge of each member being flanged for connection with a support, the margins adjacent the flanged edges being substantially thicker than the opposite margins of the members, each of said members having an aperture therein, a broad friction plate on the outside surface of each member, a bolt passing thru said plates and said apertures and spring means on said bolt for resiliently clamping the plates and members together, said apertures being larger than the bolts whereby to permit movement of the members with respect to said friction plates.

15. The device of claim 14 in which said broad friction plates each have on one side edge an even number of fingers and have on the other side edge an odd number of fingers, said fingers being at right angles to the plates and being so spaced as to bring the odd number of fingers each between two even number of fingers and being slightly spaced from the side edges of said plate like members.

16. A non-load supporting snubbing assembly adapted to be associated with a nest of helical bolster springs in a railway car truck comprising a spring cap for replacing the upper spring cap in existing equipment, a second spring cap for replacing the lower spring cap in existing equipment, and a snubbing device loosely connecting said caps, said device comprising a series of friction plates resiliently held together side to side, one of the inner plates having a turned edge for connection to the upper cap and another of the inner plates having a similar turned edge for connection with the lower cap, said caps having elongated hanger means for loosely receiving and retaining said turned edges, said two inner plates being thicker at the turned margin than at the portion engaging the outer plates.

ERNEST G. GOODWIN.